E. J. STODDARD.
EQUALIZING GEARING FOR AUTOMOBILES.
APPLICATION FILED MAY 11, 1912.
1,066,958.
Patented July 8, 1913.
2 SHEETS—SHEET 1.
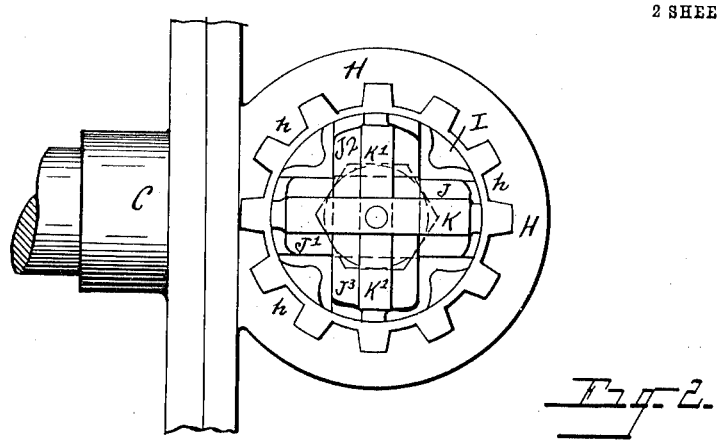
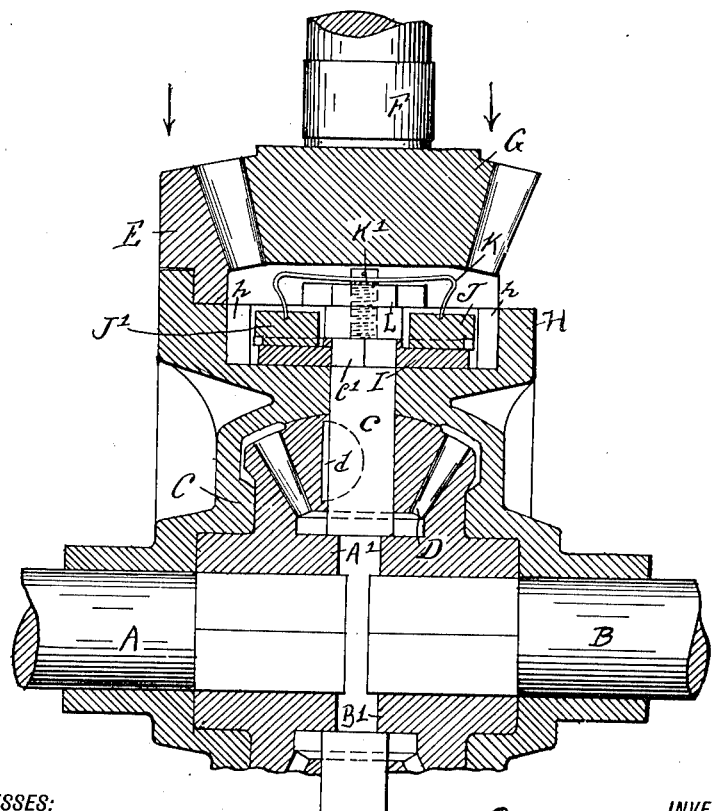

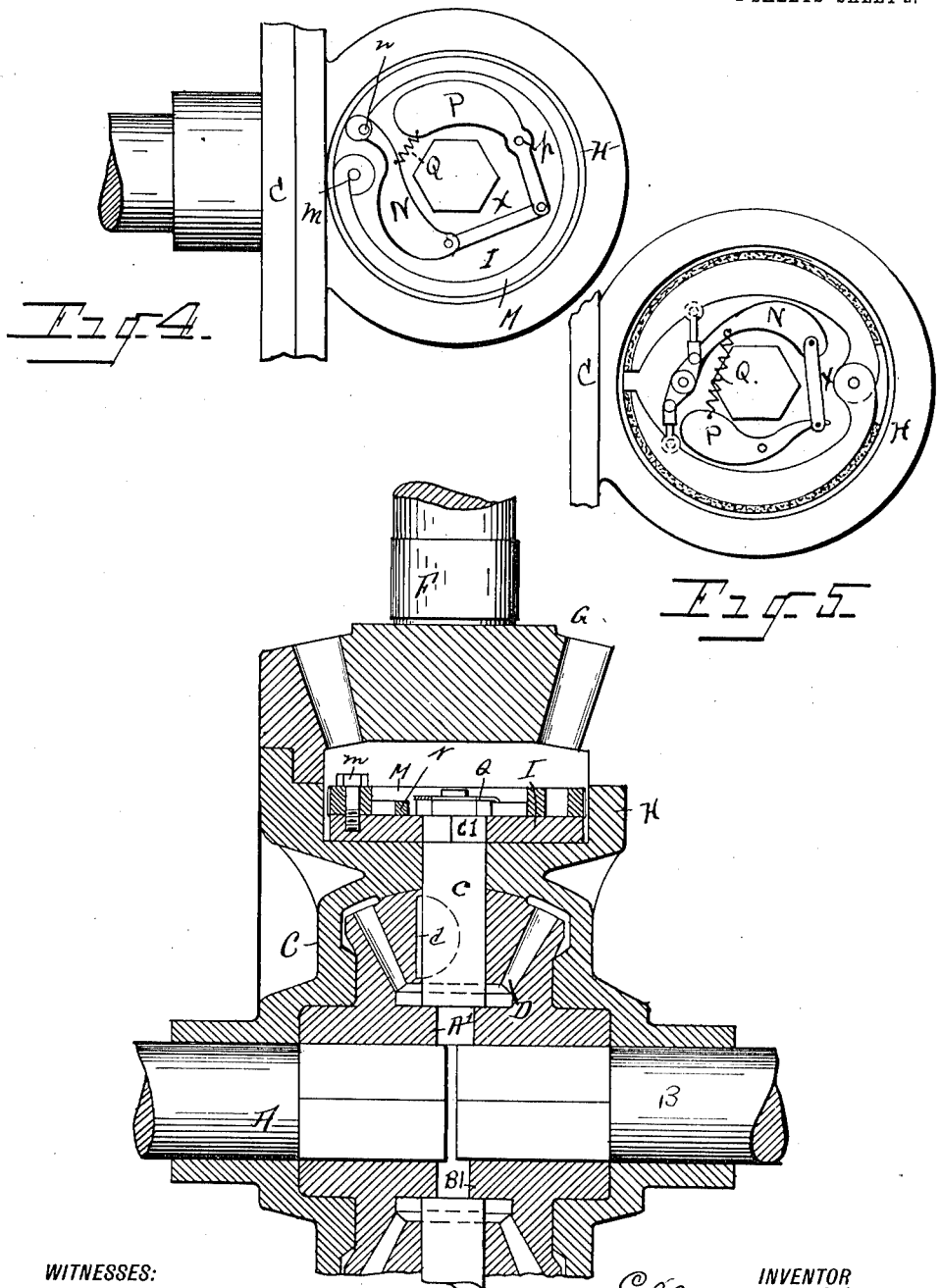

UNITED STATES PATENT OFFICE.

ELLIOTT J. STODDARD, OF DETROIT, MICHIGAN.

EQUALIZING-GEARING FOR AUTOMOBILES.

1,066,958.          Specification of Letters Patent.          Patented July 8, 1913.

Application filed May 11, 1912. Serial No. 696,571.

*To all whom it may concern:*

Be it known that I, ELLIOTT J. STODDARD, a citizen of the United States, residing at Detroit, county of Wayne, State of Michigan, have invented a certain new and useful Improvement in Equalizing-Gearing for Automobiles, and declare the following to be a full, clear, and exact description of the same, such as will enable others skilled in the art to which it pertains to make and use the same, reference being had to the accompanying drawings, which form a part of this specification.

My invention relates to equalizing gearing for automobiles, and an object of my improvements is to provide means whereby a relative angular movement of the two driving wheels shall lock the two parts of the driving shaft and consequently the two driving wheels together. I accomplish this object in the device illustrated in the accompanying drawings, in which,—

Figure 1, is a sectional view of a part of one form of equalizing gearing with the mechanism embodying my invention adjusted thereto. Fig. 2, is an elevation of the mechanism of Fig. 1 looking in the direction of the arrows, the wheel G and the toothed annulus E being removed. Fig. 3, is a view similar to Fig. 1 showing a modified form of my invention. Fig. 4, is an elevation similar to Fig. 2 of the modification shown in Fig. 3. Fig. 5, is a view similar to Fig. 4 showing a second modification.

A and B are the two parts of the driving shaft of an automobile.

$A^1$, $B^1$ are beveled gears secured to the squared adjacent ends of the parts A, B of the driving axle.

C, is a casing sleeved upon the parts A, B of the driving shaft and adapted to rotate upon said parts as a bearing.

D, is the usual intermediate beveled gear wheel, its teeth engaging the teeth of the gear wheels $A^1$ and $B^1$. The gear wheel D is secured by a key $d$ to a shaft $c$ which extends radially to the driving shaft and is adapted to rotate in a bearing in the casing C. The outer end of the shaft $c$ is squared as shown at $C^1$ and upon this squared end fits a disk I.

J, $J^1$, $J^2$, $J^3$, are steel blocks adapted to slide in radial ways on the disk I. The outer ends of the blocks J, $J^1$, $J^2$, $J^3$ are provided with teeth, as shown most distinctly in Fig. 2.

K and $K^1$ are springs acting to draw the blocks J, $J^1$, $J^2$, $J^3$, inward.

L, is a nut by which the disk I is secured in place.

H, is an annular flange provided with internal teeth $h$. The flange H is concentric with and incloses the disk I as shown.

E, is the usual bevel toothed annulus secured upon the casing C as shown.

F, is the driving shaft and G is a driving pinion engaging the teeth of the annulus E to rotate the casing C which acts through the beveled gear wheels D, $A^1$, $B^1$ to turn the shaft parts A, B.

The operation of the above described device is as follows: Should one wheel slip its corresponding shaft part A or B will turn faster than the other part of said shaft and the beveled wheel D will be rotated turning the shaft $c$ and disk I causing the steel blocks J to fly outward by centrifugal force, their teeth engaging the interior teeth $h$ of the flange H so that further rotation of the beveled gear wheel D is prevented and the two parts of the shaft are locked together so that they must turn together.

In the form of the device shown in Figs. 3 and 4 the construction is the same except that instead of the blocks J, $J^1$, $J^2$, $J^3$, with their teeth engaging interior teeth on the flange H, a friction arrangement is shown acting to bind the disk I to the flange H. In this instance, the friction device is shown as a split ring M pivoted to the disk I at $m$ and there are levers N, P pivoted to said disk respectively at $n$, $p$. These levers are weighted toward their ends remote from the pivots $n$, $p$ as shown at R and S and there is a spring Q acting to resiliently draw the lever N toward the center of the disk I. The lever N is provided with a cam or other appropriate device for acting upon the ring M to expand the same and force it against the interior surface of the flange H when the lever N is caused to turn by centrifugal force.

There will be a number of beveled gear wheels D and the arrangement above described connected therewith. Half of these may have the friction device adapted to act most efficiently in one direction and half in the other direction.

In the device shown in Fig. 5, there are two half rings adapted to act in opposite directions.

In the devices of Figs. 4 and 5 the levers

N and P are connected by a link X and are weighted at opposite ends so as to balance each other in the usual way.

The frictional devices are preferably so designed that friction shall hold them in engagement.

Owing to the limited space and nature of the mechanism, it is necessary that the device should be automatically held in engagement so as to form a positive lock.

The method of designing the clutches is within the knowledge of the art and consists generally in making the line of action of the frictional forces come sufficiently far within the pivotal point of the shoe, pawl or brake, so that the tendency of the two surfaces to move relative to each other shall force said shoes into closer engagement, or, in making the angle to the normal to the surface which it contacts one whose tangent is less than the coefficient of friction. As soon as the tendency of one surface to move relative to the other ceases, the shoes will be drawn out of engagement by their springs. Of course the springs acting to release the shoes or brakes are given such a tension that the slight rotation due to the vehicle turning a corner shall not act to carry the shoes into engagement.

What I claim is:—

1. In an equalizing gearing, two rotatable parts, a part intermediate said first mentioned parts adapted to actuate the same while permitting relative motion thereof, and means whereby the relative motion of said rotatable parts locks the intermediate part.

2. In an equalizing gearing, two rotatable parts, a part intermediate said first mentioned parts adapted to actuate the same while permitting relative motion thereof, and a locking means for said intermediate part adapted to be actuated by the motion of the same caused by the relative motion of the first mentioned parts.

3. The shafts A, B, gear wheels A', B' thereon, an intermediate gear wheel D, centrifugal apparatus connecting with the wheel D, and a locking mechanism connected with the wheel D so that the rotation of the same shall actuate said locking mechanism to prevent the wheel D from rotating.

4. In an equalizing gearing, two rotatable parts, a part intermediate said first mentioned parts adapted to actuate the same and to be rotated by the relative motion thereof, and a centrifugal locking mechanism connected with said intermediate part adapted to prevent the rotation of said intermediate part for the purpose described.

5. The shafts A, B, gear wheels A' B' thereon, an intermediate gear wheel D, a part that is stationary relative to the gear wheel D, an apparatus on the gear wheel D adapted to engage a relatively immovable surface on said part so that its friction shall hold it in engagement therewith to form a positive lock, a centrifugal apparatus on the wheel D adapted to actuate said apparatus to carry it into contact with said relatively stationary surface, substantially as and for the purpose described.

In testimony whereof, I sign this specification in the presence of two witnesses.

ELLIOTT J. STODDARD.

Witnesses:
LOTTA LEE BRAY,
VIRGINIA C. SPRATT.